United States Patent [19]
Griffin et al.

[11] Patent Number: 5,843,219
[45] Date of Patent: Dec. 1, 1998

[54] INK JET INK COMPOSITION

[75] Inventors: Mary Catherine Ambrose Griffin, Cambridge; John Philip Tatum, Isleham; Jill Woods, March, all of England

[73] Assignee: Xaar Technology Limited, Cambridge, England

[21] Appl. No.: 828,670

[22] Filed: Mar. 31, 1997

Related U.S. Application Data

[63] Continuation of PCT/GB95/02501 Oct. 23, 1995.

[30] Foreign Application Priority Data

Oct. 24, 1994 [GB] United Kingdom .................... 9421395

[51] Int. Cl.$^6$ ...................................................... C09D 11/02
[52] U.S. Cl. ................... 106/31.88; 106/31.6; 106/31.86
[58] Field of Search .............................. 106/31.86, 31.88, 106/31.6

[56] References Cited

U.S. PATENT DOCUMENTS

| | | | |
|---|---|---|---|
| 3,946,138 | 3/1976 | Jones | 428/514 |
| 4,256,494 | 3/1981 | Yamamoto et al. | 106/31.86 |
| 4,954,174 | 9/1990 | Imagawa | 106/31.86 |
| 5,091,004 | 2/1992 | Tabayashi et al. | 106/31.27 |
| 5,350,446 | 9/1994 | Lin et al. | 106/31.88 |
| 5,453,121 | 9/1995 | Nicholls et al. | 106/31.88 |
| 5,702,512 | 12/1997 | Yano et al. | 106/31.86 |

FOREIGN PATENT DOCUMENTS 454 872 A1  11/1991  European Pat. Off. .

*Primary Examiner*—Helene Klemanski
*Attorney, Agent, or Firm*—Marshall, O'Toole, Gerstein, Murray & Burun

[57] ABSTRACT

A dispersion ink for ink jet printing and which is stable and produces good quality print on plain paper for extended periods of time without the need to interrupt printing to clean the print head, comprises a diluent containing a non-polar component, a pigment and a dispersant for stabilizing the dispersion of the pigment in the diluent, and has a polar solubility parameter greater than 0 but not greater than 7.0 $MPa^{1/2}$ and a dewetting velocity of at least 100 $\mu m.sec^{-1}$, measured on a surface having a surface energy of $10\pm1$ $mN.m^{-1}$.

13 Claims, No Drawings

INK JET INK COMPOSITION

This is continuation of International Application No. PCT/GB95/02501 filed Oct. 23, 1995.

The present invention relates to ink composition for use in ink jet printers and in particular to such compositions, hereinafter referred to as dispersion inks, comprising a diluent, a pigment and a dispersant for stabilising the dispersion of the pigment in the diluent.

A problem with dispersion inks is to obtain a composition which is stable and yet which will yield a well-defined print, substantially free of feathering, and of acceptable optical density, when printed on plain paper from an ink jet print head. A further problem encountered with continuous printing with such dispersion inks in an ink jet printer is that a small amount of the tail of the droplet being ejected tends to separate from the droplet and collect on the surface of that part of the area of the nozzle plate immediately surrounding the nozzle. In general, provided the surface energy of the plate is sufficiently low the ink will simply recede into the nozzle and be ejected as part of the next droplet; however as the frequency of droplet ejection is increased, there is less opportunity for the ink to recede before ejection of a subsequent droplet and there is a tendency for a pool of residual ink to form on the surface of the nozzle plate the size of which increases until it reaches a level at which it, or dust or other contaminant which is attracted to the thus wetted nozzle plate, interferes with droplet ejection and prevents reliable operation of the printer. Printing then has to be interrupted, and the problem eradicated by cleaning the printhead e.g. by wiping or, in more serious cases, by replacing the head. The problem is further exacerbated by the trend towards increasing the number of nozzles per unit area of the nozzle plate and thus reducing inter-nozzle spacing.

While the problem can be resolved to a certain extent by reducing the surface energy of the nozzle plate surface, e.g. by choice of suitable materials for the surface or by surface treatment, this may not be an adequate solution where the diluent on which the ink is based is substantially non-polar e.g. as in the case of inks based on hydrocarbon diluents. The use of such low polarity diluents in forming inks is advantageous because it reduces or avoids problems of materials compatibility in the printing system (e.g. printer body, cartridges, glues and printing media).

Thus the problem addressed by the present invention is to provide a stable dispersion ink based on a non-polar solvent such as hydrocarbon and which yields well defined prints of acceptable optical density when printed from an ink jet print head and enables the length of the print run without interruption for cleaning or replacing the print head to be increased.

EP-A-0454872 describes a dispersion ink in which the colouring component has a particle size of not less than 0.01 micron and the dispersion medium comprises a liquid having a surface tension of not more than 50 dynes/cm at 25° C., and wherein the dispersion medium separates immediately from the colouring component at the moment the ink composition is deposited on an image recording material. Examples are given of inks with polar solvents and of inks with non-polar solvents. There are no examples of mixtures of polar and non-polar solvents. The ink is said to produce a circular dot with a clear contour and does not permeate along fibers of paper. However, the non-wetting characteristics of the ink are not discussed and even the best inks had precipitated within three months of storage at 70° C.

We have now found in accordance with the present invention that the problem may be resolved by providing a stable ink jet ink composition comprising a diluent containing a non-polar liquid as a major component of the diluent by weight, a pigment and a dispersant for stabilising the dispersion of the pigment in the diluent, said composition having a polar solubility parameter greater than zero but not greater than 7 $MPa^{1/2}$ and a dewetting velocity of at least 100 $\mu m.sec^{-1}$ on a surface having a surface energy of $10\pm1 mN.m^{-1}$. The required polar solubility parameter is achieved by including a minor amount of a polar liquid, or mixture of polar liquids, in the diluent.

Preferably the viscosity of the dispersion will be less than 60 mPas, measured at 30° C. using a Bohlin C. S. rheometer with CP4/40 measuring system, and more preferably no greater than 30 mPas, for inks intended to be printed at about ambient temperature. However, for inks intended to be printed at temperatures above ambient, higher viscosities are acceptable.

References herein to polar solubility parameter are to the values obtained according to the method of Hansen, C. M. and Skaarup, K., Journal of Paint Technology, 39 No. 51, pp.511–514 (1967) as detailed by, Patton, T. C. "Paint Flow & Pigment Dispersion" 2nd Ed., Wiley Interscience, 1979.

The surface energy, otherwise known as critical surface tension, is measured using the method of Zisman, described at page 351 ff of "Physical Chemistry of Surfaces" by Adamson AW 3rd Edition, John Wiley & Sons 1976, in which the cosines of the contact angles on a surface are measured for a series of liquids. The data are plotted against the surface tensions of the liquids and the critical surface tension is defined as the surface tension where the extrapolated curve gives a value for the cosine of the contact angle of unity. The liquids used for measurement are suitably 1-octanol, ethan-1,2-diol, n-octane and n-hexane, but others may be employed. A Krüss K12 Process Tensiometer is used to measure the downward force on a rectangular polymer wafer coated on both sides with a coating chosen to provide the desired surface energy of $10\pm1 mN.m^{-1}$, immersed in the chosen liquid. The cosine of the contact angle, C, is given by $C=F/[2\eta(w+t)]$, where w and t are the width and thickness of the coated polyimide rectangle, respectively $\eta$ is surface tension and F is the downward force, after correction for the weight of the polyimide and its buoyancy.

A suitable surface for the measurement of dewetting velocity for the purposes of the present invention may be prepared from a one-step fluorosilane coating composition comprising methyl triethoxy silane, 3-aminopropyl triethoxy silane and 1H,1H,2H,2H-perfluorooctyl triethoxysilane. The following is an example of obtaining such a surface, 30 parts ethanol, 0.9 part glacial acetic acid, 2.0 parts hexanol and 5 parts hydrochloric acid (0.01 $mol/dm^3$) are mixed together and then 5 parts methyl triethoxysilane, 0.5 part 3-aminopropyl triethoxysilane and 0.5 part 1H,1H, 2H,2H perfluorooctyl triethoxysilane are added to the mixture.

The solution so formed is then allowed to age for 2 days to allow hydrolysis of the silicon compounds. A sheet of Upilex-R polyimide is washed with about 1 $mol/dm^3$ NaOH, rinsed well with water and dried by wiping with a clean room wipe and the aged solution is applied to the surface of the sheet using a meter bar to form a wet coating approximately 4 microns thick. The coated sheet is allowed to stand for 5 minutes and then placed in a humid atmosphere in an oven at 95° C. for 3 hours. The resulting fluorosilane coating thickness is of the order of 0.6 microns.

Upilex-R is available from the Ube Chemical Company of Japan. Upilex is a trade name which may be a registered trade mark in one or more territories designated by this application.

For a discussion of dewetting velocity and its measurement, reference is made to the article by Redon et al in Physical Review Letters, Vol 66, No. 6, 11 Feb. 1191, pages 715–718. In general, the higher the dewetting velocity of the ink, the less frequent the need to interrupt a printing operation to clean or replace the print head. Preferably, the dewetting velocity of the ink is at least 300 μm/sec, more preferably at least 500 μm/sec and still more preferably at least 1,000 μm/sec when measured on a surface with a surface energy of $10 \pm 1 mN.m^{-1}$.

As indicated above, the invention is particularly concerned with inks in which a major proportion of the diluent, by weight, is non-polar e.g. as in hydrocarbon based diluents. Particularly preferred examples of diluents are those wherein the hydrocarbon component is selected from essentially aliphatic hydrocarbons which may be used singly or in combination and may comprise, for example, distillates from the fractionation of natural or synthetic hydrocarbon mixtures. Examples of hydrocarbon-based solvents useful in the inks of the invention are dearomatised petroleum distillates e.g. Exxsol D100, Exxsol D120 and Exxsol D140, all available from Exxon, normal paraffins, e.g. Norpar 13 and Norpar 15, both available from Exxon, isoparaffins, e.g. Isopar M and Isopar V, both available from Exxon. and white oils, e.g. Somentor 32, which is an. Esso product. Single paraffinic hydrocarbons may also be used, if desired.

In accordance with the invention, the diluent also includes a minor proportion of a polar liquid or mixture of polar liquids, so as to achieve a polar solubility parameter not exceeding 7.0 $MPa^{1/2}$. This enables the achievement of a level of compatibility of the diluent with most dispersants that is required to obtain the desired minimum value for dewetting velocity. Preferably, the polar solubility parameter is not greater than 5, and more preferably not greater than 2 or 2.5 $MPa^{1/2}$. Examples of polar organic liquids that may be employed are esters, ethers, ketones, alcohols and mixtures thereof; however, the nature and concentration of said polar liquid or liquids should be such that the resultant mixture with the hydrocarbon is single phase.

In one embodiment of the invention, the diluent comprises a mixture of an aliphatic hydrocarbon (or mixture of aliphatic hydrocarbons) with a minor amount, preferably 5 to 40% by weight of the total mixture, of a polar organic liquid which may be a single component or mixture of components.

Preferred polar components are alcohols, glycols, polyglycols, ethers of glycols and polyglycols, alkoxylated alkyl phenols and admixtures thereof. Particularly preferred are glycols, polyglycols, and ethers thereof, e.g. dipropylene glycol, polypropylene glycols. preferably having molecular weights below 4000 and the mono- and di-ethers of ethylene glycol, di- and tri-ethylene glycols and ethoxylated alkyl phenols.

Preferably, the boiling point of the diluent is at least 100° C. more preferably at least 200° C. the reference to boiling point being to the temperature at which the mixture commences to boil.

In general the diluent will be substantially free of water; that is to say, it will contain no more than 5% by weight of water. In any event, the amount of water present, if any, must not be such as to cause the formation of a second liquid phase.

In accordance with the invention it has been found that for a given choice of pigment, dispersant and non-polar liquid, the dewetting velocity of the ink may be varied by adjusting the composition without any significant change in the surface tension or viscosity of the composition. Thus, a desired dewetting velocity for an ink based on a particular combination of pigment, dispersant and non-polar liquid can be readily achieved by trial and experiment.

Preferably the dispersant will be in solution in the diluent; that is to say, it will be dissolved in the diluent or will be so highly solvated that the mixture of diluent and dispersant will be indistinguishable from a true solution.

The dispersant must be capable of stabilising a dispersion of the chosen pigment in the chosen diluent whereby to obtain a stable ink composition. By stable is meant that the ink does not precipitate or coagulate within 3 months at 65° C. preferably 70°C. Polymeric dispersants are preferred because of their efficiency. Examples of suitable dispersants are condensation polymers of polyamines and fatty acids, such as those sold by Zeneca as "SOLSPERSE". Examples of other dispersants that may be used are those marketed under the trade names EFKA and DISBERBYK. Mixtures of dispersants may be used if desired. "SOLSPERSE", "EFKA" and "DISBERBYK" may be registered as trade marks in territories designated by this application. Any suitable pigment may be employed and examples are given in WO92/11209. The appropriate concentration of pigment will depend upon its nature but in general will lie in the range 2 to 20% by weight of the ink, more preferably 4 to 15% by weight. Pigment particle size is preferably in the range $1 \times 10^{-2}$ to 1 micron.

While the dewetting velocity of the ink is a function of the diluent and the dispersant, and is particularly sensitive to the compatibility of the diluent and the dispersant, it is also sensitive to the concentration of the dispersant relative to the pigment concentration in the diluent. For a given combination of diluent, dispersant and pigment, the appropriate amount of dispersant may readily be determined by experiment. In general it has been found that as the concentration of dispersant is increased from zero, the viscosity of the mixture decreases to a minimum and then commences to increase again. The theoretically optimum amount of dispersant, which tends to be in the range 0.1 to 1 part more generally 0.1 to 0.7 part, per part of pigment, by weight, is that which gives the minimum viscosity for the mixture since that should provide the most effective dispersion of the pigment. In general, suitable amounts of dispersant will be found to lie in the range 100 to 200% of that optimum amount, more preferably 110 to 150%. Larger amounts may also be employed provided that the dewetting velocity of the ink is retained above the minimum value of 100 $\mu m.sec^{-1}$.

While it has been found, unexpectedly, that the dewetting velocity of an ink is not determined simply by surface tension, viscosity and contact angle, as would be predicted for simple liquids from the work of Redon et al., in general it has been found that satisfactory printing performance in conjunction with rapid drying time of print and compatibility with a wide range of plastics and polymeric materials is obtained, even if the surface tension is below 30 $mN.m^{-1}$, because of the low polar solubility parameter of the diluent.

The energy required to eject a droplet of ink is a function, inter alia, of viscosity and for this and other reasons it is preferred that the viscosity of the ink be no greater than 60 mPas, measured as defined above, and preferably no greater than 15 mPas. The viscosity is determined largely by the viscosity of the diluent and the nature and concentration of the dispersant; however the nature and concentration of the pigment is also a factor.

The invention is now illustrated by the following Examples.

EXAMPLE 1

An ink was prepared with the following composition, in which all parts are by weight:

| Diluent | Exxsol D140[1] | 60.05 parts |
|---|---|---|
|  | Synprol[2] | 25.0 parts |
| Dispersant | Solsperse 13940[3] | 3.75 parts |
|  | Solsperse 5000[4] | 0.2 part |
| Pigment | Regal Black[5] 2500R | 11 parts |
|  |  | 100 |

The ink, the diluent of which had a polar solubility of 0.4 $mPa^{0.5}$, was found to have a dewetting velocity of 400–500 $\mu m.sec^{-1}$ measured using the fluorosilane surface described above, an apparent surface tension of 25.9 $mN.m^{-1}$ measured using a Fisher Model 20 Surface Tensiometer, and a viscosity of 11.2 mPa.s. The ink reliably produced well-defined print of acceptable good quality and optical density (optical density in the range 1.1 to 1.4) when printed on to good quality plain paper such as Xerox 3R91720 or coated paper such as Hewlett Packard LX Jet Series coated paper from a 300 dpi multi nozzle drop-on-demand printer operating at multi-line and high speed for significant periods of time without the need to interrupt printing to clean or replace the print head.

By way of comparison, when the diluent of the ink was changed so as to provide an ink having the same surface tension, a very similar viscosity (11.6 mPas) but with a polar solubility parameter of zero, as provided by mixed hydrocarbons, it was found to have a dewetting velocity of less than 100 $\mu m.sec^{-1}$ and nozzle flooding was experienced and reliable printing could not be achieved for even a short period.

Both inks were shown to be stable on storage.

(1) EXXSOL D 140 is a mixture of aliphatic hydrocarbons supplied by EXXON and having a boiling range of 280° to 317° C. and a polar solubility parameter of 0.0.

(2) SYNPROL is a mixture of $C_{13}$–$C_{15}$ aliphatic alcohols supplied by ICI Ltd. having a polar solubility of 1.4.

(3) SOLSPERSE 13940 is a polyester amine hyperdispersant marketed by Zeneca Colours Limited and contains 40% by weight active ingredient in an aliphatic distillate as diluent.

(4) SOLSPERSE 5000 is a substituted ammonium phthalocyanine marketed by Zeneca Limited.

(5) Regal Black 250R is a carbon black supplied by Cabot Corporation.

EXAMPLE 2

An ink jet ink was prepared having the following composition:

| Diluent | Exxsol D140 | 47.55 parts |
|---|---|---|
|  | Novol | 17.5 parts |
|  | Coasol | 20.0 parts |
| Pigment | Regal Black 250R | 11.0 parts |
| Dispersant | Solsperse 13940 | 3.75 parts |
|  | Solsperse 5000 | 0.2 part. |

COASOL is a mixture of diisobutyl esters of glutaric, adipic and succinic acids having a boiling range of 274° to 289° C. and marketed by Chemoxy International PLC.

The ink, which had a viscosity of 10mPas and a polar solubility parameter of less than 2 $MPa^{1/2}$, showed no signs of precipitation or coagulation after 12 weeks at 90° C. and its dewetting velocity measured on the fluorosilane surface described above, was approximately 5 $mm.sec^{-1}$. The ink produced good quality well-defined print of acceptable optical density when printed on to plain paper such as Xerox 3R91720 from a 200 dpi multi nozzle drop-on-demand printer operating at multi-line and high speed. Reliable printing was achieved for lengthy periods of time without the need to interrupt printing to clean or replace the print head.

EXAMPLES 3–24

In a series of Examples, the ink of Example 2 was modified by replacing the Coasol and 2.5 parts of the Novol with the solvents listed in the Table below and making up the difference with Exxol D140, to bring the total of all components of the ink to 100 parts by weight.

The dewetting velocities of the resultant inks were measured and the results are set out in the Table below. All the inks had a viscosity and surface tension approximately the same as that of the ink of Example 2 and the print quality obtainable from the inks was similar. The print runs attainable without interruption would be expected in all cases to be longer than those obtainable with the ink of Example 1 as a result of the higher dewetting velocities.

All the inks had a polar solubility parameter below $2MPa^{1/2}$.

| Example | Solvent | Amount (parts by weight) | Dewetting Velocity of Ink $(mm.sec^{-1})$ |
|---|---|---|---|
| 3 | Dipropylene glycol | 3 | 4.2 |
| 4 |  | 5 | 4.4 |
| 5 |  | 10 | 4.6 |
| 6 | Polypropylene glycol (Mw 425) | 3 | 2.7 |
| 7 |  | 10 | 4.9 |
| 8 | Polypropylene glycol (Mw 1000) | 3 | 3.0 |
| 9 |  | 5 | 2.7 |
| 10 |  | 10 | 3.0 |
| 11 | Polypropylene glycol monophenyl ether | 3 | 2.4 |
| 12 |  | 5 | 3.1 |
| 13 |  | 10 | 4.2 |
| 14 | Ethylene glycol monophenyl ether | 3 | 3.0 |
| 15 |  | 5 | 4.4 |
| 16 |  | 10 | 7.9 |
| 17 | Suffac N0120[6] | 1 | 3.9 |
| 18 |  | 2 | 4.3 |
| 19 |  | 3 | 6.2 |
| 20 |  | 5 | 8.7 |
| 21 |  | 7.5 | 5.9 |
| 22 | Surfac N040[7] | 2 | 2.6 |
| 23 |  | 3 | 3.4 |
| 24 |  | 5 | 3.0 |

[6]SURFAC N0120 is an ethoxylated nonyl phenol containing approximately 12 moles of ethylene oxide per mole.
[7]SURFAC N040 is an ethoxylated nonyl phenol containing approximately 4 moles of ethylene oxide per mole.
EXXSOL, SYNPROL, SOLSPERSE, REGAL, COASOL and SURFAC are trade names which may be registered as trade marks in one or more territories designated by this application.

We claim:

1. A stable ink jet ink composition comprising a diluent, a pigment, and a dispersant for stabilizing the dispersion of the pigment in the diluent, said diluent containing a non-polar component and a polar component, said non-polar component forming a major component of the diluent and said polar component being present in amount of at least 5% by weight of the diluent but such that said composition has a polar solubility parameter not greater than 7 $MPa^{1/2}$, said composition further having a dewetting velocity of at least 100 $\mu$m.sec$^{-1}$ on a surface having a surface energy of 10±1 mN.m$^{-1}$.

2. A composition as claimed in claim 1 having a surface tension of less than 30 mN.m$^{-1}$.

3. A composition as claimed in claim 1 wherein the non-polar component of the diluent comprises an aliphatic hydrocarbon or mixture of aliphatic hydrocarbons.

4. A composition as claimed in claim 3, wherein the diluent includes a polar organic liquid selected from the group consisting of alcohols, ethers, esters, ketones and mixtures thereof.

5. A composition as claimed in claim 4 wherein the polar organic liquid is selected from the group consisting of aliphatic alcohols, glycols, polyglycols, ethers of glycols and polyglycols, alkoxylated alkyl phenols and mixtures thereof.

6. A composition as claimed in claim 1 wherein the boiling point of the diluent is at least 200° C.

7. A composition as claimed in claim 1 wherein the dispersant is in solution in the diluent.

8. A composition as claimed in claim 1 wherein said composition has a dewetting velocity of at least 0.3 mm.sec$^{-1}$.

9. A composition as claimed in claim 8 wherein said composition has a dewetting velocity of at least 0.5 mm.sec$^{-1}$.

10. A composition as claimed in claim 8 wherein said composition has a dewetting velocity of at least 1 mm.sec$^{-1}$.

11. A composition as claimed in claim 1 wherein the diluent has a polar solubility parameter not greater than 5 MPa$^{1/2}$.

12. A composition as claimed in claim 11 wherein the diluent has a polar solubility parameter not greater than 2 MPa$^{1/2}$.

13. A composition as claimed in claim 1 having a viscosity of not greater than 60 mPas measured at 30° C. using a Bohlin C. S. rheometer with a CP 4/40 measuring system.

* * * * *